United States Patent
Liao et al.

(10) Patent No.: US 11,752,067 B2
(45) Date of Patent: Sep. 12, 2023

(54) PHARMACEUTICAL PACKAGING COMPOSITE FILM

(71) Applicant: NAN YA PLASTICS CORPORATION, Taipei (TW)

(72) Inventors: Te-Chao Liao, Taipei (TW); Ching-Yao Yuan, Taipei (TW); Wen-Jui Cheng, Taipei (TW); Min-Fan Chung, Taoyuan (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 23 days.

(21) Appl. No.: 17/337,665

(22) Filed: Jun. 3, 2021

(65) Prior Publication Data

US 2022/0054356 A1 Feb. 24, 2022

(30) Foreign Application Priority Data

Aug. 20, 2020 (TW) .................. 109128486

(51) Int. Cl.
*A61J 1/03* (2023.01)
*B32B 15/09* (2006.01)
(Continued)

(52) U.S. Cl.
CPC ................. *A61J 1/035* (2013.01); *B32B 7/12* (2013.01); *B32B 15/085* (2013.01); *B32B 15/09* (2013.01); *B32B 15/20* (2013.01); *B32B 27/08* (2013.01); *B32B 27/32* (2013.01); *C08L 67/02* (2013.01); *B32B 27/36* (2013.01); *B32B 2250/03* (2013.01); *B32B 2250/05* (2013.01); *B32B 2307/31* (2013.01); *B32B 2307/558* (2013.01);
(Continued)

(58) Field of Classification Search
CPC .. A61J 1/03; A61J 1/035; B65D 75/28; B65D 75/30; B65D 75/32; B65D 75/327; B65D 75/36; B32B 15/04; B32B 15/08; B32B 15/085; B32B 15/09; B32B 15/20; B32B 27/36; B32B 2307/31; B32B 2439/80; B32B 2250/03; B32B 2250/05; C08G 63/91–918; C08G 63/12; C08G 63/127; C08G 63/16; C08G 63/181; C08G 63/183; C08G 63/916
USPC .............................. 428/34.1–36.92
See application file for complete search history.

(56) References Cited

U.S. PATENT DOCUMENTS

| | | | | |
|---|---|---|---|---|
| 4,500,575 A | * | 2/1985 | Taira ...................... | C08G 63/66 428/35.8 |
| 5,589,275 A | * | 12/1996 | Breitler .................. | B32B 15/20 206/532 |
| 5,591,518 A | * | 1/1997 | Sumiya ................... | B32B 15/09 428/458 |
| 5,846,642 A | * | 12/1998 | Kimura ................... | B32B 27/36 428/35.8 |
| 5,922,164 A | * | 7/1999 | Kimura .................... | C08J 5/18 428/35.8 |

(Continued)

FOREIGN PATENT DOCUMENTS

| | | |
|---|---|---|
| CN | 211280027 U | 8/2020 |
| TW | 200616796 A | 6/2006 |
| WO | WO 2020138048 A1 | 7/2020 |

*Primary Examiner* — Michael C Romanowski
(74) *Attorney, Agent, or Firm* — Li & Cai Intellectual Property (USA) Office

(57) ABSTRACT

A pharmaceutical packaging composite film includes a heat sealing layer, an aluminum foil layer, and an impact resistant layer. The heat sealing layer contains residues derived from at least one of 1,4-butanediol, isophthalic acid, isoprene glycol, and isopropanol, and thus has a melting point between 130° C. and 180° C. The aluminum foil layer is disposed on the heat sealing layer. The impact resistant layer is disposed on the aluminum foil layer.

8 Claims, 2 Drawing Sheets

(51) Int. Cl.
*B32B 15/20* (2006.01)
*B32B 7/12* (2006.01)
*C08L 67/02* (2006.01)
*B32B 15/085* (2006.01)
*B32B 27/32* (2006.01)
*B32B 27/08* (2006.01)
*B32B 27/36* (2006.01)
*B65D 75/32* (2006.01)
*B65D 75/36* (2006.01)
*B65D 75/30* (2006.01)

(52) U.S. Cl.
CPC ............... *B32B 2307/7242* (2013.01); *B32B 2307/7265* (2013.01); *B32B 2439/80* (2013.01); *B65D 75/30* (2013.01); *B65D 75/327* (2013.01); *B65D 75/36* (2013.01)

(56) References Cited

U.S. PATENT DOCUMENTS

| | | | |
|---|---|---|---|
| 6,270,869 B1* | 8/2001 | Zeiter | B32B 27/32 206/532 |
| 6,543,208 B1* | 4/2003 | Kobayashi | B32B 7/02 428/483 |
| 2002/0114890 A1* | 8/2002 | Posey | C08J 7/0427 428/200 |
| 2008/0057237 A1* | 3/2008 | Liu | B29C 61/003 428/34.9 |
| 2008/0058488 A1* | 3/2008 | Liu | C08J 5/18 526/210 |
| 2015/0275032 A1* | 10/2015 | Deak | C08J 7/0427 427/535 |
| 2015/0283029 A1* | 10/2015 | Riis | B32B 15/20 206/438 |

\* cited by examiner

PHARMACEUTICAL PACKAGING COMPOSITE FILM

CROSS-REFERENCE TO RELATED PATENT APPLICATION

This application claims the benefit of priority to Taiwan Patent Application No. 109128486, filed on Aug. 20, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a pharmaceutical packaging material, and more particularly to a pharmaceutical packaging composite film.

BACKGROUND OF THE DISCLOSURE

Medicine is a special product used to prevent and treat diseases, and is closely connected with health and safety of consumers. Since packaging materials directly comes into contact with the medicine, if the packaging materials contain harmful substances, the harmful substances may be released from the packaging materials during use, causing a contamination of the medicine and affecting the safety of the medicine. In addition, if packaging materials are provided with poor barrier properties, then moisture, oxygen, and light may pass through the packaging materials, and reduce a shelf life of the medicine due to a chemical change produced in the medicine. Therefore, more attention needs to be devoted to the practical performance of a pharmaceutical packaging material.

Most of the conventional pharmaceutical packaging materials are made of aluminum foil, an inner heat sealable polyvinyl chloride (PVC) layer, and an outer plastic layer. However, PVC containing a plasticizer that is a toxic substance is harmful to human health, resulting in hidden dangers of safety. Although packaging materials in the market use cyclic olefin copolymers (COC) or non-PVC plastics to replace PVC, the cyclic olefin copolymers have a higher cost, and the non-PVC plastics are not completely non-toxic.

SUMMARY OF THE DISCLOSURE

In response to the above-referenced technical inadequacies, the present disclosure provides a pharmaceutical packaging composite film that is safe and non-toxic.

In one aspect, the present disclosure provides a pharmaceutical packaging composite film that includes a heat sealing layer, an aluminum foil layer, and an impact resistant layer. The heat sealing layer contains residues derived from at least one of 1,4-butanediol, isophthalic acid, isoprene glycol, and isopropanol, and thus has a melting point between 130° C. and 180° C. The aluminum foil layer is disposed on the heat sealing layer. The impact resistant layer is disposed on the aluminum foil layer.

In one embodiment of the present disclosure, the heat sealing layer contains at least one of 1 mol % to 50 mol % of the residues derived from the 1,4-butanediol, 1 mol % to 50 mol % of the residues derived from the isophthalic acid, 1 mol % to 50 mol % of the residues derived from the isoprene glycol, and 1 mol % to 50 mol % of the residues derived from the isopropanol.

In one embodiment of the present disclosure, the heat sealing layer contains 10 mol % of the residues derived from the isoprene glycol and 4 mol % of the residues derived from the isopropanol.

In one embodiment of the present disclosure, a composition of the impact resistant layer includes an impact resistant polymer that is selected from the group consisting of thermoplastic polyester elastomers, nylon, polybutylene terephthalate, and polyethylene terephthalate glycol.

In one embodiment of the present disclosure, the impact resistant layer is formed from a polyester composition that includes the impact resistant polymer, and a content of the impact resistant polymer is 1 wt % to 70 wt % based on 100 wt % of the polyester composition.

In one embodiment of the present disclosure, the polyester composition further includes a general polyester, and a content of the polyester is 30 wt % to 99 wt % based on 100 wt % of the polyester composition.

In one embodiment of the present disclosure, the general polyester is polyethylene terephthalate (PET).

In one embodiment of the present disclosure, a thickness of the heat sealing layer is 10 µm to 200 µm. A thickness of the aluminum foil layer is 5 µm to 20 µm. A thickness of the impact resistant layer is 10 µm to 100 µm.

In one embodiment of the present disclosure, the pharmaceutical packaging composite film further includes a first adhesive layer and a second adhesive layer. The heat sealing layer is bonded to a surface of the aluminum foil layer by the first adhesive layer. The impact resistant layer is bonded to another opposite surface of the aluminum foil layer by the second adhesive layer.

In one embodiment of the present disclosure, each of the first adhesive layer and the second adhesive layer is formed from a polyolefin hot melt adhesive and has a thickness from 2 µm to 5 µm.

One of the beneficial effects of the present disclosure is that the pharmaceutical packaging composite film of the present disclosure can ensure the quality and safety of a medicine, and a resulting pharmaceutical packaging can remain intact during a period of storage and transportation by virtue of "the heat sealing layer containing residues derived from at least one of 1,4-butanediol, isophthalic acid, isoprene glycol, and isopropanol" and "the aluminum foil layer being disposed on the heat sealing layer and the impact resistant layer being disposed on the aluminum foil layer".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
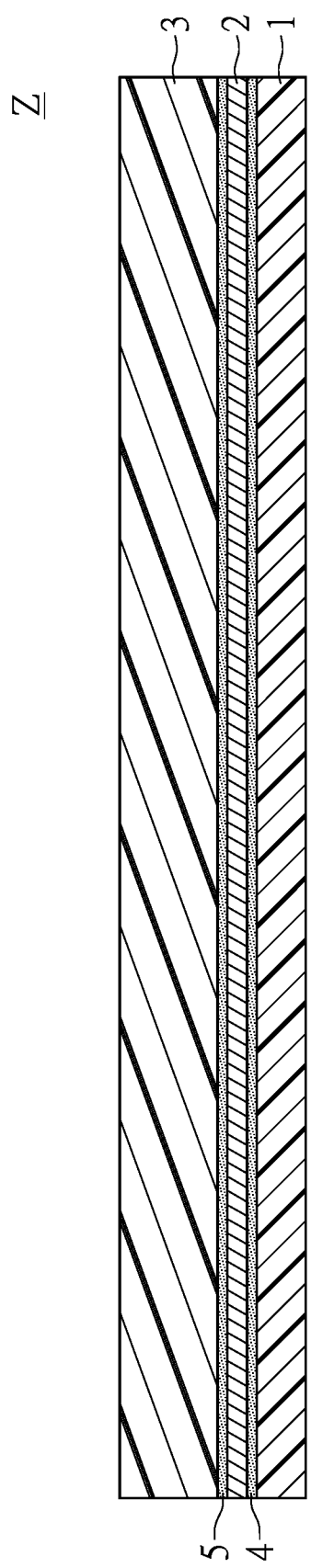
FIG. 1 is a schematic view showing a structure of a pharmaceutical packaging composite film of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Unless defined otherwise, all technical and scientific terms used herein have the same meanings as commonly understood by one of ordinary skill in the art to which this invention belongs. As used herein, the singular forms "a," "an," and "the," are intended to include the plural forms.

Unless indicated otherwise, all percentages disclosed herein are in weight percent. The upper and lower limits of these smaller ranges may independently be included in the smaller ranges and are also encompassed within the disclosure, subject to any specifically excluded limit in the stated range.

Referring to FIG. 1, an embodiment of the present disclosure provides a pharmaceutical packaging composite film Z which includes a heat sealing layer 1, an aluminum foil layer 2, and an impact resistant layer 3. The aluminum foil layer 2 is disposed on the heat sealing layer 1. The impact resistant layer 3 is disposed on the aluminum foil layer 2. In use, the heat sealing layer 1 can be melted in a hot environment (e.g., a pressurized hot environment). The aluminum foil layer 2 has an excellent barrier performance, which can prevent a medicine from deteriorating from coming into contact with moisture, gas (e.g., oxygen) or light. The impact resistant layer 3 can resist an impact of an external force so that a pharmaceutical packaging can remain intact.

The heat sealing layer 1 is a modified polyester layer that contains residues derived from at least one of 1,4-butanediol, isophthalic acid, isoprene glycol, and isopropanol. It should be noted that each of the 1,4-butanediol, the isophthalic acid, the isoprene glycol, and the isopropanol can be formed into an oligomer mixture during a polymerization process. Thus, the heat sealing layer 1 based on a polyester has a lower melting point that is within a range from 130° C. to 180° C. Accordingly, the composite film Z of the present disclosure can be heat sealed at such a temperature range. Furthermore, a heat sealing strength of the composite film Z is affected by a thickness of the heat sealing layer 1. If the heat sealing layer 1 has a greater thickness, the composite film Z has a stronger heat sealing strength. In consideration of practicability and costs, the thickness of the heat sealing layer 1 can be 10 μm to 200 μm.

Figure 2:
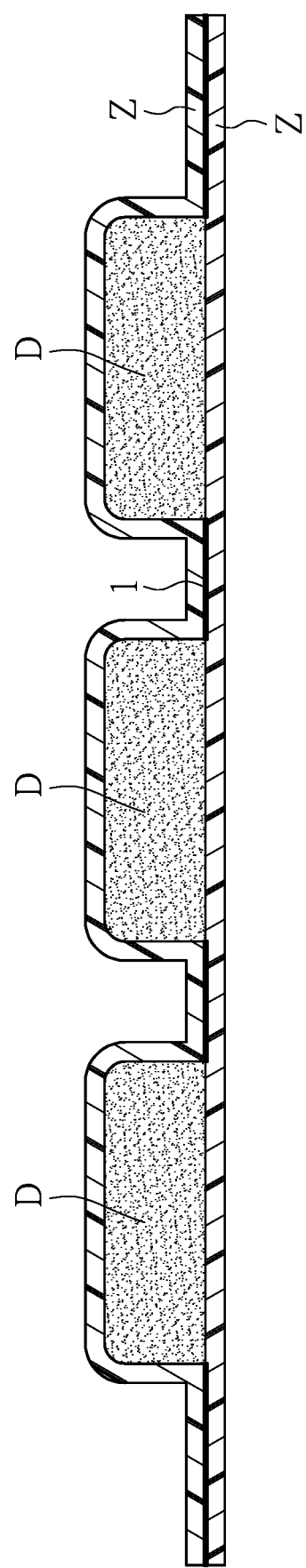
FIG. 2 is a schematic view showing an implementation of the pharmaceutical packaging composite film of the present disclosure.

Referring to FIG. 2, in practice, a medicine D can be placed between two composite films Z that are laminated together in a manner where two heat sealing layers 1 thereof face inward and abut against each other. Subsequently, the two heat sealing layers 1 can be melted and combined integrally with each other by heat pressing so as to form the pharmaceutical packaging.

In the present embodiment, the heat sealing layer 1 can contain 1 mol % to 50 mol % of the residues derived from the 1,4-butanediol, 1 mol % to 50 mol % of the residues derived from the isophthalic acid, 1 mol % to 50 mol % of the residues derived from the isoprene glycol, and/or 1 mol % to 50 mol % of the residues derived from the isopropanol, and preferably contains 10 mol % of the residues derived from the isoprene glycol and 4 mol % of the residues derived from the isopropanol. The term "residue" as used herein refers to a group or unit derived from a specific compound of a chemical reaction product, such as a group derived from a diacid or diol component of a polyester or copolyester synthesized by an esterification or polycondensation reaction.

More specifically, the heat sealing layer 1 can be formed from a first polyester composition that mainly includes a general polyester and a modifier. For example, the first polyester composition can be melted and stretched into a molten layer, and the molten layer is cooled and shaped to form the heat sealing layer 1. The general polyester of the first polyester composition is polyethylene terephthalate (PET), and the modifier of the first polyester composition is selected from at least one of 1,4-butanediol, isophthalic acid, isoprene glycol, and isopropanol. Based on 100 wt % of the first polyester composition, a content of the general polyester can be 30 wt % to 99 wt %, and a content of the modifier can be 1 wt % to 50 wt %. However, the above description is only exemplary, and is not intended to limit the scope of the present disclosure. In certain embodiments, the general polyester can be polytrimethylene terephthalate (PTT), polybutylene terephthalate (PBT), polyethylene naphthalate (PEN), or polybutylene naphthalate (PBN).

The aluminum foil layer 2 can be formed from a high purity aluminum foil (having an aluminum content of at least 99%) or a modified aluminum foil doped with metal and non-metal elements. A thickness of the aluminum foil layer 2 can be 5 μm to 20 μm, and preferably 10 μm. A thicker aluminum foil layer 2 (i.e., the thickness of the aluminum foil layer 2 being greater than 20 μm) results in an increase in production cost. A thinner aluminum foil layer 2 (i.e., the thickness of the aluminum foil layer 2 being less than 5 μm) cannot achieve a required barrier effect. It should be noted that in the presence of the aluminum foil layer 2, moisture, oxygen gas, and light cannot come into direct contact with a medicine and causes adverse effects on the medicine, thereby ensuring the quality and safety of the medicine and extending a shelf life of the medicine. In certain embodiments, in order to increase pinhole resistance and ductility, the aluminum foil layer 2 is doped with iron and silicon. An iron content can be 0.1 wt % to 5 wt %, and preferably 0.3 wt % to 1 wt %. An silicon content can be 0.1 wt % to 5 wt %, and preferably 0.3 wt % to 1 wt %.

The impact resistant layer 3 is a polyester layer, and a composition of the impact resistant layer includes an impact resistant polymer. It should be noted that in the presence of the impact resistant layer 3, an impact resistance of the composite film Z of the present disclosure is nearly doubled, so that a resulting pharmaceutical packaging is maintained intact during a period of storage and transportation. In order to achieve a required impact resistance, a thickness of the impact resistant layer 3 can be 50 μm to 100 μm. In certain embodiments, the thickness of the impact resistant layer 3 can be 55 μm, 60 μm, 65 μm, 70 μm, 75 μm, 80 μm, 85 μm, 90 μm, or 95 μm.

More specifically, the impact resistant layer 3 can be formed from a second polyester composition that mainly includes a general polyester and the impact resistant polymer. For example, the second polyester composition can be melted and stretched into a molten layer, and the molten layer is cooled and shaped to form the impact resistant layer 3. The general polyester of the second polyester composition is PET, PTT, PBT, PEN, or PBN, and preferably PET. The impact resistant polymer of the second polyester composition is selected from the group consisting of thermoplastic polyester elastomers (TPEE), nylon (e.g., nylon 6, nylon 11, nylon 66, or nylon 12), polybutylene terephthalate, and polyethylene terephthalate glycol (PTEG). Based on 100 wt % of the second polyester composition, a content of the general polyester can be 30 wt % to 99 wt %, and a content of the impact resistant polymer can be 1 wt % to 70 wt %. However, the above description is only exemplary, and is not intended to limit the scope of the present disclosure.

According to particular implementations, the second polyester composition can include at least one functional additive, such as a colorant, an inorganic polyester modifier, a flow promoter, a nucleant, and/or an antioxidant. More specifically, the colorant can be added to change an appearance color of the composite film Z, and it is exemplified by carbon black, titanium dioxide, barium sulfate and calcium carbonate.

The inorganic polyester modifier is able to increase a heat resistance of the impact resistant layer 3. Moreover, in the presence of the inorganic polyester modifier, the impact resistant layer 3 can have a desired surface roughness and haze value. Specific examples of the inorganic polyester modifier include silicon dioxide ($SiO_2$), titanium dioxide ($TiO_2$), aluminum hydroxide ($Al(OH)_3$), aluminum oxide ($Al_2O_3$), magnesium hydroxide ($Mg(OH)_2$), magnesium oxide (MgO), calcium carbonate ($CaCO_3$), boron oxide ($B_2O_3$), calcium oxide (CaO), strontium titanate ($SrTiO_3$), barium titanate ($BaTiO_3$), calcium titanate ($CaTiO_3$), magnesium titanate ($2MgO \cdot TiO_2$), cerium oxide ($CeO_2$), fumed silica, talc, barium carbonate, calcium sulfate, barium sulfate, lithium phosphate, calcium phosphate, magnesium phosphate, boron nitride (BN), aluminum nitride (AlN), carbon black, and kaolin. The inorganic polyester modifier can be in the form of particles, and a content thereof can be 0.01 wt % to 2 wt % based on 100 wt % of the second polyester composition.

The flow promoter is able to reduce mechanical torque on a polyester material when melt-extruded, and is able to reduce chain scission of a polymer. The flow promoter can be pentaerythritol stearate (PETS) or its analogues, which have good thermal stability, low volatility, and a higher flowability and mold release properties at high temperatures, and provides good nucleation effect to a partially crystalline polyester. Based on 100 wt % of the second polyester composition, a content of the flow promoter can be 0.01 wt % to 2 wt %.

The nucleant is able to increase a total crystallinity, thus improving a heat resistance of the impact resistant layer 3. Furthermore, the nucleant is able to promote crystal growth, resulting in fine crystals, and to reduce the formation of large spherulites and avoid the embrittlement of film surfaces. The nucleant can be a mineral material, a metal oxide, a silicon compound, a metal salt of an organic or inorganic acid, a phosphate ester metal salt, a polyol derivative, a sulfonylimide compound, a glass powder, a metal powder, or any combination thereof. Based on 100 wt % of the second polyester composition, a content of the nucleant can be 0.0003 wt % to 2 wt %.

Specific examples of the mineral material serving as the nucleant include graphite, talc and, kaolin. Specific examples of the metal oxide serving as the nucleant include zinc oxide, aluminum oxide, and magnesium oxide. Specific examples of the silicon compound serving as the nucleant include silicon oxide, calcium silicate, and magnesium silicate. Specific examples of the metal salt of an organic or inorganic acid serving as the nucleant include metal carbonates such as magnesium carbonate, calcium carbonate, sodium carbonate and potassium carbonate, barium sulfate, calcium sulfate, sodium benzoate, and aluminum p-tert-butylbenzoate. The phosphate ester metal salt serving as the nucleant is exemplified by an aromatic phosphate ester metal salt. The polyol derivative serving as the nucleant is exemplified by dibenzylidene sorbitol.

One or both of a primary antioxidant and a secondary antioxidant can be used as the antioxidant of the second polyester composition of the impact resistant layer 3. The primary antioxidant can quickly react with peroxyl radicals (ROO.) to stop free radical chain reactions. The secondary antioxidant can react with hydroperoxides (ROOH) to convert them into radical-free and non-reactive substances. It should be noted that the primary antioxidant and the secondary antioxidant can produce a synergistic effect so as to provide better antioxidative effect.

The primary antioxidant can be selected from phenolic compounds or amine compounds, exemplified by commercially available products with trade names of Irganox 1010, Irganox 1425, Irganox 245, Anox 1315, Anox PP18, Anox 20, Lowinox 1790, Lowinox TBM-68, and Naugard 445. Based on 100 wt % of the second polyester composition, a content of the primary antioxidant can be 0.01 wt % to 1 wt %. The secondary antioxidant can be selected from phosphorous compounds or thioester compounds, exemplified by commercially available products with trade names of Sandostab P-EPQ, Irgafos 168, and Naugard 412S. Based on 100 wt % of the second polyester composition, a content of the secondary antioxidant can be 0.01 wt % to 1 wt %.

In addition, an unstretched impact resistant layer 3 can be stretched to have excellent mechanical properties. In certain embodiments, a successive biaxial stretching process is applied to the unstretched impact resistant layer 3. That is, the unstretched impact resistant layer 3 is stretched in the machine direction (MD) (also called "length direction") at a predetermined temperature and stretch ratio, and is then stretched in the transverse direction (TD) (also called "width direction") at a predetermined temperature and stretch ratio. According to particular requirements, a stretching process of the machine direction and a stretching process of the traverse direction can be applied in the reverse order. That is, the unstretched impact resistant layer 3 can be simultaneously and biaxially stretched in the machine direction and transverse direction at a predetermined temperature and stretch ratio.

Reference is further made to FIG. 1, in the present embodiment, the heat sealing layer 1 can be bonded to a surface (e.g., an inner surface) of the aluminum foil layer 2 by a first adhesive layer 4. The impact resistant layer 3 can be bonded to another opposite surface (e.g., an outer surface) of the aluminum foil layer 2 by a second adhesive layer 5. Each of the first adhesive layer 4 and the second adhesive layer 5 can be a polyolefin layer, and a composition of the polyolefin layer includes a polyolefin (PO) and a hot melt adhesive. A thickness of each of the first adhesive layer 4 and the second adhesive layer 5 can be 2 µm to 5 µm.

Table 1 lists several representative embodiments of the composite film material Z for pharmaceutical packaging of the present disclosure. However, the present disclosure is not limited to such examples.

TABLE 1

| Items | | Examples | | | Comparative example |
|---|---|---|---|---|---|
| | | 1 | 2 | 3 | 1 |
| Heat sealing layer | 1,4-butanediol (mol %) | 0 | 0 | 0 | 0 |
| | Isophthalic acid (mol %) | 0 | 0 | 0 | 0 |
| | Isoprene glycol (mol %) | 10 | 0 | 11 | 0 |
| | Isopropanol (mol %) | 4 | 12.5 | 10 | 21 |
| Aluminum foil layer | Aluminum (%) | 99.2 | 99.2 | 99.2 | 99.2 |
| | Iron (%) | 0.4 | 0.4 | 0.4 | 0.4 |
| | Silicon (%) | 0.2 | 0.2 | 0.2 | 0.2 |
| Impact resistant layer | PET (wt %) | 80 | 90 | 90 | 100 |
| | Thermoplastic polyester elastomer (wt %) | 20 | 10 | 0 | 0 |
| | Nylon (wt %) | 0 | 10 | 0 | 0 |
| | PETG (wt %) | 0 | 0 | 10 | 0 |
| Physical properties of composite film | Thickness of heat sealing layer (Measured by a thickness meter) | 20 | 20 | 20 | 20 |
| | Heat sealing strength (Measured in accordance with the ASTM F2029 standard) | ◎ | ◎ | △ | × |
| | Impact resistance (Measured in accordance with the ASTM D256 standard) | ◎ | ○ | ○ | △ |
| | Encapsulation performance (Evaluated from product appearance) | ◎ | ◎ | △ | × |
| Comprehensive evaluation result | | ◎ | ◎ | ◎ | × |

"◎" represents an excellent performance;
"○" represents a good performance;
"△" represents a poor performance; and
"×" represents a very poor performance.

One of the beneficial effects of the present disclosure is that the pharmaceutical packaging composite film of the present disclosure can ensure the quality and safety of a medicine, and a resulting pharmaceutical packaging can remain intact during a period of storage and transportation by virtue of "the heat sealing layer containing residues derived from at least one of 1,4-butanediol, isophthalic acid, isoprene glycol, and isopropanol" and "the aluminum foil layer being disposed on the heat sealing layer and the impact resistant layer being disposed on the aluminum foil layer".

More specifically, the heat sealing layer is a modified polyester layer that is safe and non-toxic and thus will not cause environmental pollution, and can be used in place of a polyvinyl chloride (PVC) heat sealing layer commonly used in industry. Furthermore, 1,4-butanediol, isophthalic acid, isoprene glycol, and isopropanol can be formed into an oligomer mixture during a polymerization process, so that the heat sealing layer 1 based on a polyester has a lower melting point that is from 130° C. to 180° C. Therefore, the composite film of the present disclosure can be heat sealed at a lower temperature, resulting in a decrease in production cost. In practice, the thickness of the heat sealing layer can be adjusted to control heat sealing strength.

More specifically, the composition of the impact resistant layer includes an impact resistant polymer that is selected from the group consisting of thermoplastic polyester elastomers (TPEE), nylon (e.g., nylon 6, nylon 11, nylon 66, or nylon 12), polybutylene terephthalate, and polyethylene terephthalate glycol (PTEG). Therefore, an impact resistance of the composite film of the present disclosure can be nearly doubled.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pharmaceutical packaging composite film, comprising:
    a heat sealing layer comprising a polyester composition including (i) a general polyester polymer selected from the group consisting of polyethylene terephthalate, polytrimethylene terephthalate, polybutylene terephthalate, polyethylene naphthalate, and polybutylene naphthalate and (ii) a modifier compound including residues derived from isoprene glycol and isopropanol, the heat sealing layer having a melting point between 130° C. and 180° C.;
    an aluminum foil layer disposed on the heat sealing layer; and
    an impact resistant layer disposed on the aluminum foil layer.

2. The pharmaceutical packaging composite film according to claim 1, wherein a composition of the impact resistant layer includes an impact resistant polymer that is selected from the group consisting of thermoplastic polyester elastomers, nylon, polybutylene terephthalate, and polyethylene terephthalate glycol.

3. The pharmaceutical packaging composite film according to claim 2, wherein the impact resistant layer is formed from a polyester composition that includes the impact resistant polymer, and a content of the impact resistant polymer is 1 wt % to 70 wt % based on 100 wt % of the polyester composition.

4. The pharmaceutical packaging composite film according to claim 3, wherein the polyester composition further includes a general polyester, and a content of the general polyester is 30 wt % to 99 wt % based on 100 wt % of the polyester composition.

5. The pharmaceutical packaging composite film according to claim 4, wherein the general polyester is polyethylene terephthalate.

6. The pharmaceutical packaging composite film according to claim 1, wherein a thickness of the heat sealing layer is 10 μm to 200 μm, a thickness of the aluminum foil layer is 5 μm to 20 μm, and a thickness of the impact resistant layer is 10 μm to 100 μm.

7. The pharmaceutical packaging composite film according to claim 1, wherein the pharmaceutical packaging composite film further includes a first adhesive layer and a second adhesive layer, the heat sealing layer is bonded to a surface of the aluminum foil layer by the first adhesive layer, and the impact resistant layer is bonded to another opposite surface of the aluminum foil layer by the second adhesive layer.

8. The pharmaceutical packaging composite film according to claim 7, wherein each of the first adhesive layer and the second adhesive layer is formed from a polyolefin hot melt adhesive and has a thickness from 2 μm to 5 μm.

* * * * *